June 18, 1968  E. D. MICHAUD  3,388,540
ROTARY LAWN MOWER CUTTING APPARATUS
Filed Oct. 18, 1965
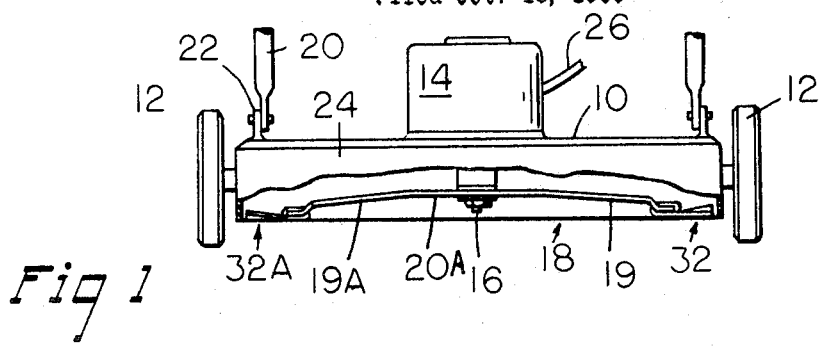
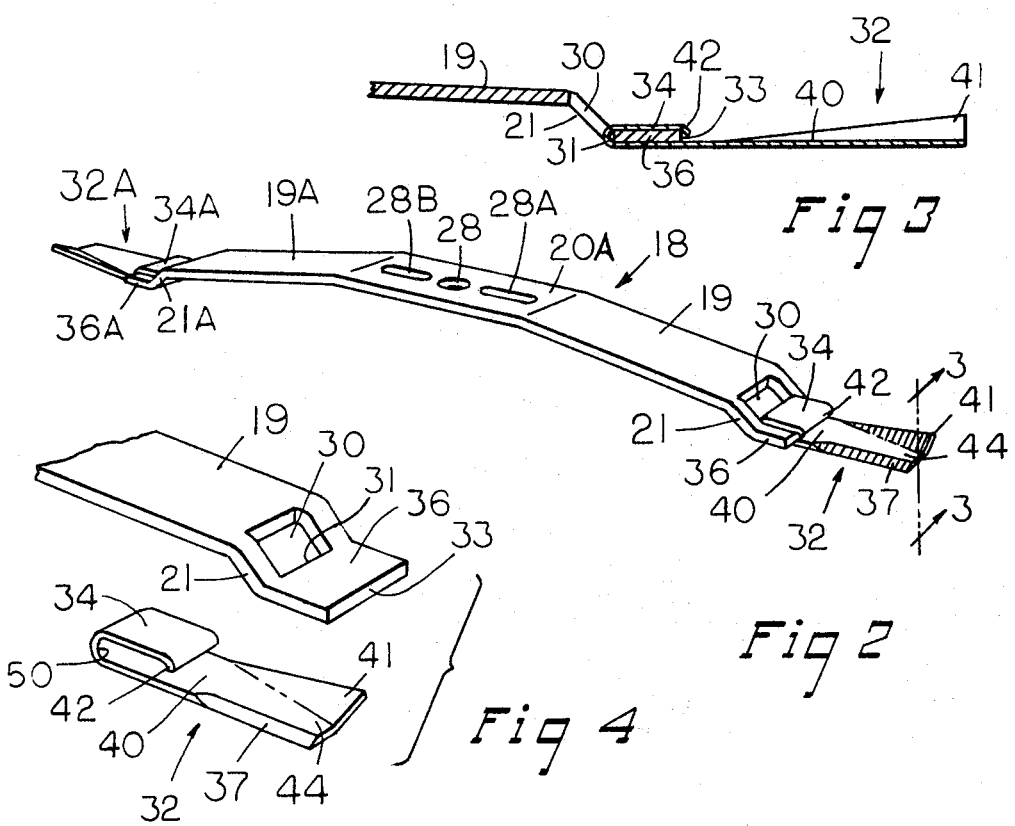
INVENTOR
ERNEST DENNIS MICHAUD
BY
*William Frederick Werner*
ATTORNEY United States Patent Office 3,388,540
Patented June 18, 1968

3,388,540
ROTARY LAWN MOWER CUTTING APPARATUS
Ernest Dennis Michaud, R.F.D.,
Saunderstown, R.I. 02874
Filed Oct. 18, 1965, Ser. No. 497,216
3 Claims. (Cl. 56—295)

The present invention relates to rotary blade type lawn mowers and more particularly, to a novel and improved blade for use with the foregoing type of lawn mower.

In rotary blade type lawn mowers it is customary to utilize an elongated cutter blade or bar arranged to be rotated by suitable power means in order to cut grass. Heretofore, each cutter bar has normally been manufactured as an integral unit. This is to say, the bar was constituted as a single rigid member, the extreme outer ends of which were sharpened to a cutting edge whereby, as the mower was advanced over a lawn, the blades of grass were engaged thereby and cut. While such lawn mowers have been highly successful commercially it has been found that a unitary cutting bar is not entirely satisfactory therein. For instance, lawns frequently have stones and similar foreign materials lying thereon or embedded therein which are struck by the lawn mower bar as it is revolved while being traversed over the lawn. At the speeds which rotary type lawn mowers are generally operated, contact of the cutter bar with such foreign materials will cause the cutting edge of the bar to become dulled and chipped and may, in fact, cause major portions of the bar to break off.

The present invention has, therefore, as one of its objects to provide a rotary type lawn mower cutter bar incorporating removable cutting blades which are readily replaceable.

A further object of the present invention is to provide a rotary type lawn mower cutter bar incorporating removable cutting blades, which said blades are capable of utilization with generally all existing rotary type lawn mowers.

Still, an additional object of the present invention is to provide cutting blades for incorporation with the cutter bar of a rotary type lawn mower, which said blades are formed to have a channel to receive and expel grass clippings out by said blades.

Another object of the present invention is to provide a rotary type lawn mower cutter bar having removable blades, which said bar is economical to manufacture, efficient in operation, and durable, versatile, and reliable in use.

Other objects of the present invention will in part be obvious and will in part appear hereinafter.

The invention accordingly comprises the apparatus possessing the construction, combination of elements and arrangement of parts which are exemplified in the following detailed disclosures, and the scope of the application indicated in the claims.

The present invention is an improvement over that disclosed in my co-pending patent application Ser. No. 325,709 filed Nov. 22, 1963, and now Patent 3,243,944.

For a fuller understanding of the nature and objects of the present invention reference should be had to the following detailed description taken in connection with the accompanying drawing wherein:

FIGURE 1 is a front elevational view of a rotary blade type lawn mower with portions broken away incorporating the improved cutter bar of the instant invention.

FIGURE 2 is an enlarged perspective view of the cutter bar of the present invention.

FIGURE 3 is an enlarged fragmentary cross sectional view taken on line 3—3 of FIGURE 2 and illustrates the removable cutter blade attached to the cutter bar.

FIGURE 4 is an exploded perspective view of a cutter blade and a portion of a cutter bar.

Briefly, the present invention contemplates the provision of an elongated rotary type lawn mower cutter bar, the ends of which are provided with slots, openings or pockets. Each slot accommodated one end of a cutting blade constituted as an insert, the other end of each blade being sharpened along one margin to cut grass. The opposite margin is turned up to provide a concavity or channel. This concavity serves as a clearance channel into which grass clippings may be admitted and subsequently expelled outwardly.

Turning now to a detailed description of the invention, reference is firstly made to FIGURE 1 wherein is shown a conventional type rotary lawn mower. The reference numeral 10 indicates the mobile frame of the mower. It will be seen that the frame 10 is supported for movement on wheels 12. A motor 14 is mounted on the top of frame 10, this motor having a power shaft 16 depending below the limits of the frame and mounting a horizontally disposed rotary cutter bar 18 at the lowermost end thereof. The mower is guided by handle bars 20 suitably attached to lugs 22 fastened on frame 10, it being understood that, in the complete mower structure, these handle bars would be of sufficient height to be grasped by an operator. A skirt-like guard 24 is attached to frame 10 and extends downwardly to enclose the zone of movement of cutter bar 18 for safety purposes. As illustrated herein motor 14 is of the electric type having a cord 26 running from a source of current to the motor, it being appreciated that a suitable switch, not shown herein, would be provided to control the electrical current to the motor.

The instant invention is illustrated, for convenience, in connection with a conventional lawn mower employing an electric motor as the power source and having but one rotary cutter bar. It is to be understood that the present invention is by no means limited to this specific lawn mower. Rather, the instant invention has equal application to all types of rotary lawn mowers, be they powered by electricity, gasoline, or otherwise. Moreover, applicant's invention is readily usable with a rotary type lawn mower having one or more rotary cutters bars operated parallel to the ground.

With attention directed to all of the figures in the drawing, it will be seen that the preferred embodiment of the present invention is constituted as an elongated cutter bar, generally indicated by reference numeral 18 and having a horizontal medial area 20A pierced through at 28 midway along its length for the reception of shaft 16. Two locating elongated slots 18A and 18B are provided to engage locating pins when such are provided on a hub for shaft 16. Elongated cutter bar 18 is bent downwardly on the sides 19, 19A opposite horizontal medial area 20A. Said sides 19, 19A terminate in oppositely located horizontal lips 36, 36A offset, respectively, at 21 and 21A from sides 19, 19A. An opening 30 having a forward edge 31 is provided in offset 21, with the edge 31 located at one side of lip 36. It is to be understood that the opposite end of elongated cutter bar 18 at offset 21A is identically constructed.

At this point it will serve to indicate that the blades, generally indicated by reference numerals 32, 32A, are alike in construction as well as in their mounting means. Thus, as attention is now directed to the blades it will serve to describe but one of these blades, the description, of course being equally applicable to the companion blade bearing the suffix "A."

Each blade consists of a horizontally projecting body member 40 having one end folded upon itself to form a U shaped spring member 34 having a marginal edge bent downwardly to provide a gripping edge 42. Body member 40 is provided with a cutting edge 37 and an oppositely located upwardly projecting wing 41 which forms a channel 44 cooperating with said horizontally projecting body member 40.

Gripping edge 42 and spring member 34 are passed through opening 30 so that spring member 34 surrounds lip 36 with gripping edge 42 engaging end 33 of lip 36 and abutting the forward edge 31.

In this manner a removable cutter blade 32 positively grips the end of a cutter bar 18 with the horizontal body member 40 of the blade 32 projecting as an extension of the cutter bar 18. The cutter blade 32 being offset from the horizontal connection of the cutter bar 18 with the lawn mower rotating shaft 16.

The elongated cutter bar 18 extends along a horizontal axis with the detachable cutter blades 32, 32A an extension of said horizontal axis. Said cutter blades are located in a lower plane due to the downwardly bent sides 19, 19A and the offsets 21, 21A.

Cutter blades 32, 32A, are equidistant with respect to shaft 16 in order to maintain dynamic balance of the elongated cutter bar 18 as it is rotated. As elongated cutter bar 18 is rapidly rotated centrifugal force operates to assist in stabilizing the cutting blades 32, 32A in elongated cutter bar 18 in cooperation with forward edges 31 and the walls of openings 30.

In the event it is desired to change a blade the appropriate gripping edge 42 is raised above forward edge 31. This is readily done because gripping edge 42 is part of spring member 34.

In placing a new cutting blade 32 in position gripping edge 42 is lifted above forward edge 31 and slid across lip 36 to a position where gripping edge 42 engages end 33 with a resilient grip, and wedging the lip 36 between gripping edge 42 and the back indicated at 50 of U shaped spring member 34.

Having shown and described a preferred embodiment of the present invention by way of example, it should be realized that structural changes could be made and other examples given without departing from either the spirit or scope of this invention.

What I claim is:

1. A rotary lawn mower cutting apparatus having a rotary shaft, that improvement therein comprising an elongated cutter bar having two blade receiving end portions, each end portion provided with an opening, said elongated cutter bar having a longitudinal axis, each opening being parallel to said longitudinal axis, means mounting said cutter bar to said rotary shaft, two detachable grass cutting blades, each blade consisting of a horizontally projecting body member having one end folded upon itself to form a spring member, said body member having a cutting edge provided in one side, a projecting wing located in the opposite side, and the spring member of each blade removably attaching said grass cutting blades, respectively, to said blade receiving end portions through the openings.

2. A claim constructed in accordance with claim 1, characterized by said elongated cutter bar having a horizontal medial area, opposite sides of said elongated cutter bar being bent downwardly from said horizontal medial area, and terminating in oppositely located horizontal lips offset, respectively, from said sides, said openings being located, respectively, in the offsets with each opening having a forward edge, each spring member having a gripping edge, said elongated cutter bar having opposite ends, said spring members when attaching said cutting blades to said blade receiving end portions, through the openings, abutting the respective forward edges and having the gripping edges engaging the respective ends of said elongated cutter bar.

3. A claim constructed in accordance with claim 1 characterized by said wing forming a channel in cooperation with said horizontally projecting body member, for receiving grass clippings severed by said blade and discharging said clippings radially of the rotative path of said blade.

References Cited
UNITED STATES PATENTS

| | | | |
|---|---|---|---|
| 2,740,249 | 4/1956 | Stearns | 56—295 |
| 2,924,058 | 2/1960 | Brooks | 56—295 |
| 2,924,059 | 2/1960 | Beeston | 56—295 |
| 3,050,924 | 8/1962 | West | 56—295 |
| 3,225,527 | 12/1965 | Spear | 56—25.4 |

RUSSELL R. KINSEY, *Primary Examiner.*